(12) United States Patent
Ramos Carrillo

(10) Patent No.: US 11,306,765 B1
(45) Date of Patent: Apr. 19, 2022

(54) SELF-LOCKING THREADED CONNECTION ELEMENT

(71) Applicants: Estefania Docampo López, Pontevedra (ES); José Manuel Ramos Carrillo, Pontevedra (ES)

(72) Inventor: José Manuel Ramos Carrillo, Pontevedra (ES)

(73) Assignees: Estafania Docampo López, Pontevedra (ES); José Manuel Ramos Carrillo, Pontevedra (ES)

(*) Notice: Subject to any disclaimer, the term of this patent is extended or adjusted under 35 U.S.C. 154(b) by 0 days.

(21) Appl. No.: 17/441,117

(22) PCT Filed: Jan. 30, 2020

(86) PCT No.: PCT/ES2020/070065
§ 371 (c)(1),
(2) Date: Sep. 20, 2021

(87) PCT Pub. No.: WO2020/225463
PCT Pub. Date: Nov. 12, 2020

(30) Foreign Application Priority Data

May 3, 2019 (ES) .................... U201900230

(51) Int. Cl.
*F16B 39/30* (2006.01)
(52) U.S. Cl.
CPC .................... *F16B 39/30* (2013.01)
(58) Field of Classification Search
CPC .......... F16B 39/01; F16B 39/02; F16B 39/30; F16B 31/02; F16B 33/02; F16B 37/00; Y10S 411/929; Y10S 411/938

USPC ........ 411/259, 263, 307, 310, 411, 412, 436
See application file for complete search history.

(56) References Cited

U.S. PATENT DOCUMENTS

| 3,794,092 A * | 2/1974 | Carlson ................. B21H 3/025 |
| | | 411/938 |
| 6,685,411 B2 * | 2/2004 | Kato ..................... F16B 35/047 |
| | | 411/386 |
| 2003/0206787 A1 * | 11/2003 | Huang ................ F16B 25/0068 |
| | | 411/412 |

FOREIGN PATENT DOCUMENTS

GB     1454769     12/1976

OTHER PUBLICATIONS

International Search Report for patent application PCT/ES2020/070065 dated Jun. 4, 2020 by the European Patent Office, in English.
Written Opinion of the International Searching Authority for patent application PCT/ES2020/070065 uploaded to WIPO Patentscope dated Nov. 11, 2020 by the European Patent Office, in English.
International Preliminary Report on Patentability for patent application PCT/ES2020/070065 dated Jul. 29, 2021 by the European Patent Office, in English.

* cited by examiner

*Primary Examiner* — Roberta S Delisle
(74) *Attorney, Agent, or Firm* — Hassan Abbas Shakir; Shakir Law PLLC

(57) ABSTRACT

A self-locking threaded connection element can be a screw or a nut, and includes a thread with a set of several turns. The thread has a thread pitch which varies from one turn to another and which enables the element to be self-locking, without seizing.

11 Claims, 3 Drawing Sheets

SELF-LOCKING THREADED CONNECTION ELEMENT

BACKGROUND OF THE INVENTION

Field of the Invention

The object of this invention is a threaded connection element that has a variation in the thread pitch, which enables the self-locking thereof. The invention may refer to both a screw, with an outer thread, and a nut, with an inner thread. Initially, the application thereof will be mostly in the industrial sector, but may be extrapolated or applied to any sector where the use of said threaded elements is required.

Discussion of the Related Art

As for the bolt, there is no prior art of a similar model. Currently, in order to maintain a tight screw, a standard screw with the conventional nut thereof must be used.

As a device similar to the nut disclosed, on the market we will find the self-locking nut (DIN 985). This self-locking nut contains, in order to enable the fit thereof, an inner nylon washer, which prevents the use thereof under high temperatures, it has a limited number of uses and a single type of tightening.

SUMMARY OF THE INVENTION

The present invention consists of a threaded connection element, such as a bolt or a nut, which has a type of threading that enables it to be self-locking without being loosened. Based on a conventional bolt or nut, a variable pitch is applied, when making the thread, along the length thereof, which enables self-locking to be obtained without being too tight, jamming or breaking.

The bolt is designed for use, in many of the possible applications, without needing any nuts to be fitted. Moreover, the nut can be combined with conventional screws. In any case, the self-locking bolt and nut can be coupled together.

This new thread system with variable pitch is applicable for all types of existing threads.

BRIEF DESCRIPTION OF THE DRAWINGS

To complement the description provided herein, and for the purpose of helping to make the characteristics of the invention more readily understandable, said description is accompanied by a set of drawings constituting an integral part of the same, which by way of illustration and not limitation represents the following.

DETAILED DESCRIPTION OF THE INVENTION

Figure 1:
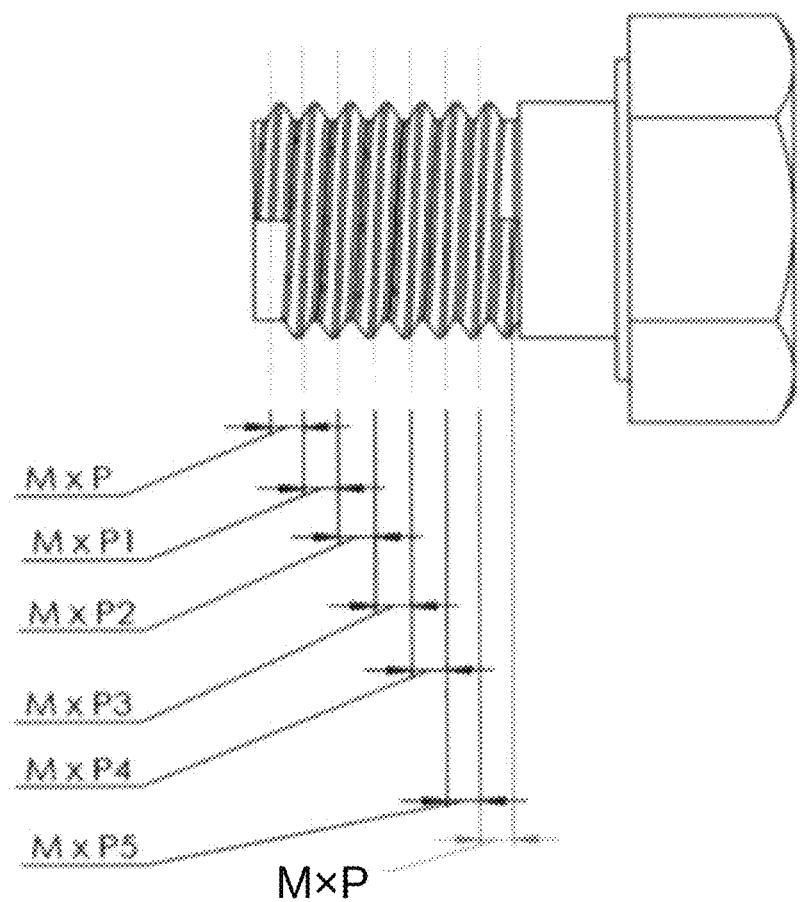
FIG. 1 shows a side view of the self-locking bolt for a thread system "X" and thread pitch "P".
Figure 2:
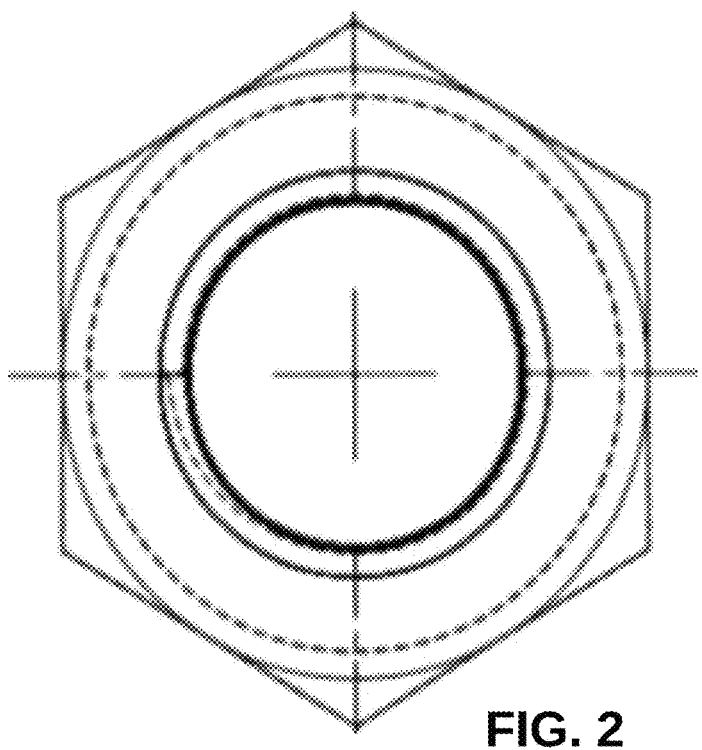
FIG. 2 is a front view of the self-locking bolt.
Figure 3:
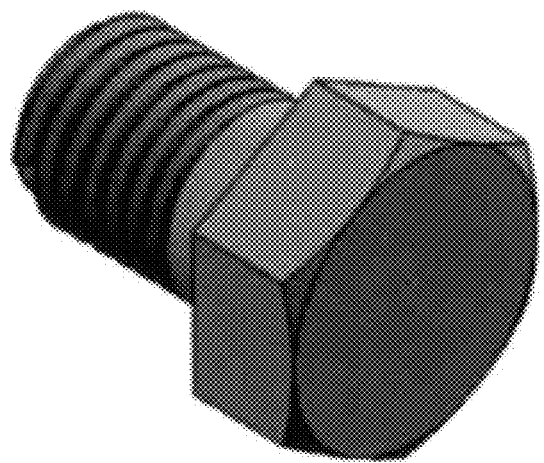
FIG. 3 is isometric view of the self-locking bolt.
Figure 4:
FIG. 4 is an isometric view of the self-locking bolt.
Figure 5:
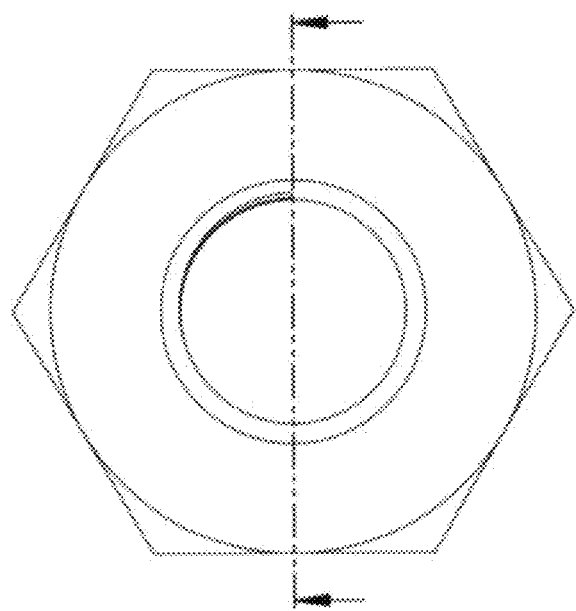
FIG. 5 is a side view of the self-locking nut.
Figure 6:
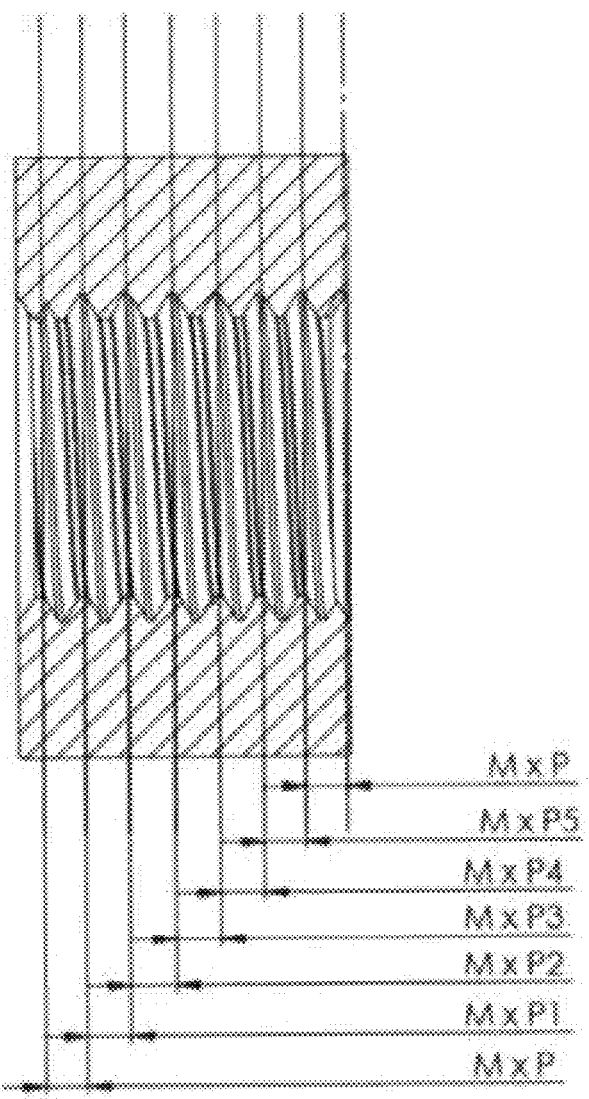
FIG. 6 is a front view of the self-locking nut.
Figure 7:
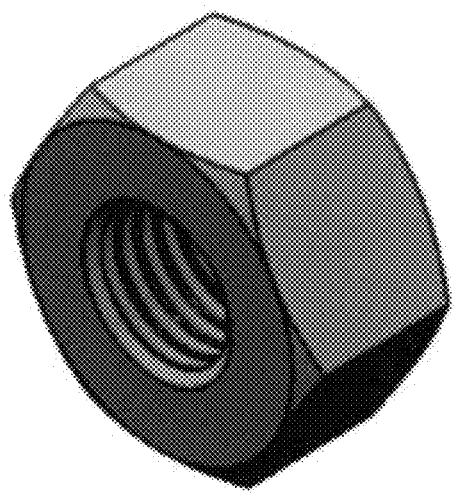
FIG. 7 is an isometric view of the self-locking nut.

The present invention relates to a self-locking threaded connection element which is characterised in that it attempts to achieve an optimal threading profile, by means of specific variations in the measurements of the thread pitch, whether it is an external male thread element (bolt) or an internal female thread element (nut), in order to ensure that said element is self-locking, without seizing. In other words, the threaded element of the invention has a thread with a set of turns having different thread pitch values, such that the thread pitch of one of the turns is different from the thread pitch of any of the other turns.

This new thread system with variable pitch is applicable to all types of existing threads, not influencing the length in the case of the screw.

According to a preferred embodiment, the set of turns comprises a first group of turns wherein the turn pitch is increasing from one turn to another, as well as a second group of turns wherein the pitch is decreasing from one turn to another. In particular, the set of turns comprises the first group of turns which includes a number of turns wherein the thread pitch is increasing, immediately followed by the second group of turns, wherein the pitch is decreasing. In either case, the first group of turns and the second group of turns preferably include the same number of turns, for example, three, as will be explained later in the examples. The first group of turns and the second group of turns can be separated by two intermediate turns, one from each group, and which have different turn pitches. Likewise, it is preferred that the end turns of the first group of turns and the second group of turns together, i.e. the first turn of the first group and the last turn of the second group, have the same turn pitch. The same preferably applies for the second turn of the first group and the penultimate turn of the second group. Additionally, the set of turns can include a third group of turns, in continuation of the second group of turns, comprising at least one additional turn, preferably only one, and with the same turn pitch as the first turn.

For any of the examples indicated above, the set of turns preferably comprises seven turns, wherein, even more preferably, the first group and the second group each comprise three turns and the third group comprises a single turn.

As will also be indicated below, the thread can comprise several consecutive sets of turns, wherein the pattern of thread pitch values is repeated.

Each of the examples indicated above and below describes both the arrangement of the turn pitches in the indicated order, as well as in reverse order.

The mentioned variations in the measurements of the thread pitch will be made with an industrial lathe. Four self-locking ranges have been defined: loose, medium, high and very high. These four bolt models and four thread models are not the only ones possible, but they have the best results. They are defined below:

Embodiment 1: Bolt with Loose Tightening Self-Locking

Characterised in that for a thread system "X" and a thread pitch "P" it has a thread with the following measurements:

First thread pitch ("P"): thread pitch with measurement "P".

Second thread pitch (P1): characterised in that it increases the amplitude of the previous thread pitch by 0.08 mm, or in other terms, "P"+0.08 mm.

Third thread pitch (P2): characterised in that it has an increase of another 0.08 mm compared to the previous thread pitch, or in other terms, "P"+0.08 mm+0.08 mm, or also "P"+0.16 mm.

Fourth thread pitch (P3): characterised in that the thread pitch decreases 0.04 mm with respect to the previous thread pitch, or in other terms, "P"+0.16 mm−0.04 mm, or also "P"+0.12 mm.

Fifth thread pitch (P4): characterised in that it decreases another 0.04 mm with respect to the previous pitch, or also "P"+0.12 mm−0.04 mm, or in other terms, "P"+0.08 mm.

Sixth thread pitch (P5): characterised in that it is decreased 0.08 mm with respect to the previous thread pitch, for which reason we obtain the measurement of the original thread pitch again, i.e., "P"+0.08 mm−0.08 mm or, in other terms, "P".

Seventh thread pitch: it also equals the initial thread pitch, with measurement "P".

These seven pitches can be repeated sequentially along the length of the bolt, regardless of the length thereof.

Embodiment 2: Bolt with Medium Tightening Self-Locking

Characterised in that for a thread system "X" and a thread pitch "P" it has a thread with the following measurements:

First thread pitch ("P"): thread pitch with measurement "P".

Second thread pitch (P1): characterised in that it increases the amplitude of the previous thread pitch by 0.12 mm, or in other terms, "P"+0.12 mm.

Third thread pitch (P2): characterised in that it has an increase of 0.08 mm compared to the previous thread pitch, or in other terms, "P"+0.12 mm+0.08 mm, or also "P"+0.2 mm.

Fourth thread pitch (P3): characterised in that the thread pitch decreases 0.04 mm with respect to the previous thread pitch, or in other terms, "P"+0.2 mm−0.04 mm, or also "P"+0.16 mm.

Fifth thread pitch (P4): characterised in that it decreases another 0.04 mm with respect to the previous pitch, or also "P"+0.16 mm−0.04 mm, or in other terms, "P"+0.12 mm.

Sixth thread pitch (P5): characterised in that it is decreased 0.12 mm with respect to the previous thread pitch, for which reason we again obtain the measurement of the original thread pitch again, i.e., "P"+0.12 mm−0.12 mm or, in other terms, "P".

Seventh thread pitch: it also equals the initial thread pitch, with measurement "P".

These seven pitches can be repeated sequentially along the length of the bolt, regardless of the length thereof.

Embodiment 3: Bolt with High Tightening Self-Locking

Characterised in that for a thread system "X" and a thread pitch "P" it has a thread with the following measurements:

First thread pitch ("P"): thread pitch with measurement "P".

Second thread pitch (P1): characterised in that it increases the amplitude of the previous thread pitch by 0.16 mm, or in other terms, "P"+0.16 mm.

Third thread pitch (P2): characterised in that it has an increase of 0.08 mm compared to the previous thread pitch, or in other terms, "P"+0.16 mm+0.08 mm, or also "P"+0.24 mm.

Fourth thread pitch (P3): characterised in that the thread pitch decreases 0.04 mm with respect to the previous thread pitch, or in other terms, "P"+0.24 mm−0.04 mm, or also "P"+0.2 mm.

Fifth thread pitch (P4): characterised in that it decreases another 0.04 mm with respect to the previous pitch, or also "P"+0.2 mm−0.04 mm, or in other terms, "P"+0.16 mm.

Sixth thread pitch (P5): characterised in that it is decreased 0.16 mm with respect to the previous thread pitch, for which reason we again obtain the measurement of the original thread pitch again, i.e., "P"+0.16 mm−0.16 mm or, in other terms, "P".

Seventh thread pitch: it also has the initial thread pitch value, with measurement "P".

These seven pitches can be repeated sequentially along the length of the bolt, regardless of the length thereof.

Embodiment 4: Bolt with Very High Tightening Self-Locking

Characterised in that for a thread system "X" and a thread pitch "P" it has a thread with the following measurements:

First thread pitch ("P"): thread pitch with measurement "P".

Second thread pitch (P1): characterised in that it increases the amplitude of the previous thread pitch by 0.2 mm, or in other terms, "P"+0.2 mm.

Third thread pitch (P2): characterised in that it has an increase of 0.08 mm compared to the previous thread pitch, or in other terms, "P"+0.2 mm+0.08 mm, or also "P"+0.28 mm.

Fourth thread pitch (P3): characterised in that the thread pitch decreases 0.04 mm with respect to the previous thread pitch, or in other terms, "P"+0.28 mm−0.04 mm, or also "P"+0.24 mm.

Fifth thread pitch (P4): characterised in that it decreases another 0.04 mm with respect to the previous pitch, or also "P"+0.24 mm−0.04 mm, or in other terms, "P"+0.2 mm.

Sixth thread pitch (P5): characterised in that it is decreased 0.2 mm with respect to the previous thread pitch, for which reason we again obtain the measurement of the original thread pitch again, i.e., "P"+0.2 mm−0.2 mm or, in other terms, "P".

Seventh thread pitch: it also has the same value of the initial thread pitch, with measurement "P".

These seven pitches can be repeated sequentially along the length of the bolt, regardless of the length thereof.

Embodiment 1: Nut with Loose Tightening Self-Locking

Characterised in that for a thread system "X" and a thread pitch "P" it has a thread with the following measurements:

First thread pitch ("P"): thread pitch with measurement "P".

Second thread pitch (P1): characterised in that it increases the amplitude of the previous thread pitch by 0.08 mm, or in other terms, "P"+0.08 mm.

Third thread pitch (P2): characterised in that it has an increase of another 0.08 mm compared to the previous thread pitch, or in other terms, "P"+0.08 mm+0.08 mm, or also "P"+0.16 mm.

Fourth thread pitch (P3): characterised in that the thread pitch decreases 0.04 mm with respect to the previous thread pitch, or in other terms, "P"+0.16 mm−0.04 mm, or also "P"+0.12 mm.

Fifth thread pitch (P4): characterised in that it decreases another 0.04 mm with respect to the previous pitch, or also "P"+0.12 mm−0.04 mm, or in other terms, "P"+0.08 mm.

Sixth thread pitch (P5): characterised in that it is decreased 0.08 mm with respect to the previous thread pitch, for which reason we again obtain the measurement of the original thread pitch again, i.e., "P"++0.08 mm−0.08 mm or, in other terms, "P".

Seventh thread pitch: it equals the initial thread pitch, with measurement "P".

These seven pitches can be repeated sequentially along the length of the bolt, regardless of the length thereof.

Embodiment 2: Nut with Medium Tightening Self-Locking

Characterised in that for a thread system "X" and a thread pitch "P" it has a thread with the following measurements:

First thread pitch ("P"): thread pitch with measurement "P".

Second thread pitch (P1): characterised in that it increases the amplitude of the previous thread pitch by 0.12 mm, or in other terms, "P"+0.12 mm.

Third thread pitch (P2): characterised in that it has an increase of 0.08 mm compared to the previous thread pitch, or in other terms, "P"+0.12 mm+0.08 mm, or also "P"+0.2 mm.

Fourth thread pitch (P3): characterised in that the thread pitch decreases 0.04 mm with respect to the previous thread pitch, or in other terms, "P"+0.2 mm−0.04 mm, or also "P"+0.16 mm.

Fifth thread pitch (P4): characterised in that it decreases another 0.04 mm with respect to the previous pitch, or also "P"+0.16 mm−0.04 mm, or in other terms, "P"+0.12 mm.

Sixth thread pitch (P5): characterised in that it is decreased 0.12 mm with respect to the previous thread pitch, for which reason we again obtain the measurement of the original thread pitch again, i.e., "P"+0.12 mm−0.12 mm or, in other terms, "P".

Seventh thread pitch: it equals the initial thread pitch, with measurement "P".

These seven pitches can be repeated sequentially along the length of the bolt, regardless of the length thereof.

Embodiment 3: Nut with High Tightening Self-Locking

Characterised in that for a thread system "X" and a thread pitch "P" it has a thread with the following measurements:

First thread pitch ("P"): thread pitch with measurement "P".

Second thread pitch (P1): characterised in that it increases the amplitude of the previous thread pitch by 0.16 mm, or in other terms, "P"+0.16 mm.

Third thread pitch (P2): characterised in that it has an increase of 0.08 mm compared to the previous thread pitch, or in other terms, "P"+0.16 mm+0.08 mm, or also "P"+0.24 mm.

Fourth thread pitch (P3): characterised in that the thread pitch decreases 0.04 mm with respect to the previous thread pitch, or in other terms, "P"+0.24 mm−0.04 mm, or also "P"+0.2 mm.

Fifth thread pitch (P4): characterised in that it decreases another 0.04 mm with respect to the previous pitch, or also "P"+0.2 mm−0.04 mm, or in other terms, "P"+0.16 mm.

Sixth thread pitch (P5): characterised in that it is decreased 0.16 mm with respect to the previous thread pitch, for which reason we again obtain the measurement of the original thread pitch again, i.e., "P"+0.16 mm−0.16 mm or, in other terms, "P".

Seventh thread pitch: it equals the initial thread pitch, with measurement "P".

These seven pitches can be repeated sequentially along the length of the bolt, regardless of the length thereof.

Embodiment 4: Nut with Very High Tightening Self-Locking

Characterised in that for a thread system "X" and a thread pitch "P" it has a thread with the following measurements:

First thread pitch ("P"): thread pitch with measurement "P".

Second thread pitch (P1): characterised in that it increases the amplitude of the previous thread pitch by 0.2 mm, or in other terms, "P"+0.2 mm.

Third thread pitch (P2): characterised in that it has an increase of 0.08 mm compared to the previous thread pitch, or in other terms, "P"+0.2 mm+0.08 mm, or also "P"+0.28 mm.

Fourth thread pitch (P3): characterised in that the thread pitch decreases 0.04 mm with respect to the previous thread pitch, or in other terms, "P"+0.28 mm−0.04 mm, or also "P"+0.24 mm.

Fifth thread pitch (P4): characterised in that it decreases another 0.04 mm with respect to the previous pitch, or also "P"+0.24 mm−0.04 mm, or in other terms, "P"+0.2 mm.

Sixth thread pitch (P5): characterised in that it is decreased 0.2 mm with respect to the previous thread pitch, for which reason we again obtain the measurement of the original thread pitch again, i.e., "P"+0.2 mm−0.2 mm or, in other terms, "P".

Seventh thread pitch: it equals the initial thread pitch, with measurement

These seven pitches can be repeated sequentially along the length of the bolt, regardless of the length thereof.

This self-locking bolt and nut offer important advantages compared to conventional screws and nuts. Here are some examples of the application thereof on an industrial level:

In the industrial sector, clearances during the machining of parts which have threads (female or male), due to errors such as breakage of plates, power outages, etc., lead to the part made being discarded. The self-locking bolt (or nut, if applicable) enables an optimal fit, without coming loose, which prevents the existence of the aforementioned clearances, saving on the cost of manufacturing a new part.

In the case of machinery containing threaded parts, susceptible to being worn out by use, and wherein it is necessary to disassemble said machine in order to replace the parts, the use of the self-locking bolt (or nut, if applicable) enables the perfect fit to any worn thread surface, without having to replace the part, thus preventing the expense created by the machine stopping due to a breakdown.

In plumbing, in cases of leaks or losses, the self-locking bolt (or nut) can be used to replace the Teflon which is normally used, thus obtaining a better fit.

In the case of mechanical stops, the self-locking bolt enables us to do without the locknut, which is an important advantage since on many occasions it is difficult to access a nut (whether it be in machines for industrial use, surgical traumatology, etc.) in order to be able to fit, remove or modify the position of the screw.

If the use of two conventional nuts is necessary, the use of the self-locking bolt enables us to do without one of them.

As for the self-locking nut with self-locking and, in contrast to the aforementioned self-locking nut (DIN 985), it is worth noting the use thereof in high-temperature conditions, the unlimited number of uses thereof and an adjustable fit, apart from being bidirectional.

What is claimed is:

1. A self-locking threaded connection element comprising:
    a thread with a set of several turns,
    wherein the thread comprises a thread pitch which varies from one turn to another, wherein the thread comprises a first group of turns which includes a number of turns wherein the thread pitch is increasing, followed by a second number of turns wherein the thread pitch is decreasing, or the reverse, and wherein the set of turns comprises:
    first turn, with a thread pitch value equal to a reference value (P);
    second turn, with a thread pitch value increased by 0.08 mm with respect to the reference value (P);
    third turn, with a thread pitch value increased by 0.16 mm with respect to the reference value (P);
    fourth turn, with a thread pitch value increased by 0.12 mm with respect to the reference value (P);
    fifth turn, with a thread pitch value increased by 0.08 mm with respect to the reference value (P); and
    sixth turn, with a thread pitch value equal to the reference value (P); and
    seventh turn, with a thread pitch value equal to the reference value (P).

2. The self-locking threaded connection element according to claim 1, wherein the second group of turns is located immediately in continuation of the first group of turns.

3. The self-locking threaded connection element, according to claim 2, wherein the last turn of the first group and the first turn of the second group do not have the same thread pitch.

4. The self-locking threaded connection element, according to claim 2, wherein the first turn of the first group and the last turn of the second group have a thread pitch of equal value.

5. The self-locking threaded connection element, according to claim 4, wherein the second turn of the first group and the penultimate turn of the second group have a thread pitch of equal value.

6. The self-locking threaded connection element, according to claim 2, further comprising a third group of turns with at least one turn, with the pitch equal to the first turn of the first group.

7. The self-locking threaded connection element, according to claim 1, wherein the first group of turns and the second group of turns have the same number of turns.

8. The self-locking threaded connection element, according to claim 7, wherein the first group and the second group are each formed by three turns.

9. The self-locking threaded connection element, according to claim 1, wherein the set of turns is repeated consecutively.

10. The self-locking threaded connection element, according to claim 1, wherein the self-locking threaded connection element is an element with an outer male thread.

11. The self-locking threaded connection element, according to claim 1, wherein the self-locking threaded connection element is an element with an inner female thread.

* * * * *